United States Patent [19]

Härtel

[11] Patent Number: 4,757,981

[45] Date of Patent: Jul. 19, 1988

[54] ACTIVE TWO-CHAMBER ENGINE MOUNT

[75] Inventor: Volker Härtel, Germering, Fed. Rep. of Germany

[73] Assignee: Metzeler Kautschuk GmbH, Munich, Fed. Rep. of Germany

[21] Appl. No.: 916,605

[22] Filed: Oct. 8, 1986

[30] Foreign Application Priority Data

Oct. 8, 1985 [DE] Fed. Rep. of Germany ....... 3535906

[51] Int. Cl.⁴ .......................... F16F 15/04; B60K 5/12
[52] U.S. Cl. ................................ 267/140.1; 188/267;
188/322.5; 267/35; 267/219; 180/312
[58] Field of Search .................. 267/140.1, 35, 8 R,
267/217, 218, 219, 220; 188/267, 268, 322.5;
248/562, 566, 638; 180/312, 291; 252/71, 73,
74; 137/13, 826, 827

[56] References Cited

U.S. PATENT DOCUMENTS 3,071,154  1/1963  Cargill et al. .................. 137/827 X
3,599,428  8/1971  Chaney et al. ................. 137/827 X
4,621,795 11/1986  Eberhard et al. ............... 267/8 R

FOREIGN PATENT DOCUMENTS 1282568  7/1972  United Kingdom .............. 188/268

Primary Examiner—George E. A. Halvosa
Assistant Examiner—Matthew C. Graham
Attorney, Agent, or Firm—Herbert L. Lerner; Laurence A. Greenberg

[57] ABSTRACT

An active two-chamber engine mount with hydraulic damping includes rubber-elastic peripheral walls, a rigid intermediate plate disposed between the walls defining chambers, an electro-viscous fluid filling the chambers and flowing in a given fluid flow direction through at least one overflow opening formed in the rigid intermediate plate. At least two mutually parallel metallic mesh plates are successively disposed across the given fluid flow direction in the vicinity of the at least one overflow opening, and a control device for alternatingly applying an electric field to the mesh plates as electrodes for controlling the viscosity of the fluid.

14 Claims, 4 Drawing Sheets

ACTIVE TWO-CHAMBER ENGINE MOUNT

The invention relates to an active two-chamber engine mount or motor mount with hydraulic damping, especially for motor vehicles, the chambers of which have rubber-elastic peripheral walls and are filled with an electro-viscous fluid, the viscosity of which can be controlled in the vicinity of at least one overflow opening which extends through a rigid intermediate plate between the two chambers, by applying an electric field.

An engine mount of this type is known from German Published, Non-Prosecuted Application DE-OS No. 33 36 965, corresponding to U.S. patent application Ser. No. 659,714, filed Oct. 11, 1984. In that device the overflow opening is in the form of a slot-shaped canal with a rectangular cross section, the walls of which are formed by the two electrodes which generate the electric field. However, the cross section of the canal is limited by the outer dimensions of the engine mount and a suitable distance which must be provided between the electrodes, because otherwise too much voltage would be required. Furthermore, due to the slot shape of the canal, only relatively low viscosity fluids can be used which have an electro-viscous effect that is quite low.

On the other hand, it is an object of the invention to provide an active two-chamber engine mount which overcomes the hereinafore-mentioned disadvantages of the heretofore-known devices of this general type, in which there are hardly any limits to the cross section and the geometric form of the overflow opening and wherein even fluids with very high viscosity which exhibit a considerably better electro-viscous effect can be used. These provisions permit the damping and the dynamic stiffness to be much better and more precisely tuned to the respective operating conditions by correspondingly changing the viscosity of the fluid by applying an electric field.

With the foregoing and other objects in view there is provided, in accordance with the invention, an active two-chamber engine mount with hydraulic damping, especially for motor vehicles, comprising rubber-elastic peripheral walls, a rigid intermediate plate disposed between the walls defining chambers, an electro-viscous fluid filling the chambers and flowing in a given fluid flow direction through at least one overflow opening formed in the rigid intermediate plate, at least two mutually parallel metallic mesh plates successively disposed across the given fluid flow direction in the vicinity of the at least one overflow opening, and means for alternatingly applying an electric field to the mesh plates as electrodes for controlling the viscosity of the fluid.

In accordance wtih another feature of the invention, the at least one overflow opening extends vertically through the intermediate plate and has a diameter of substantially between 10 and 90% of the diameter of the the intermediate plate, the mesh plates being disposed in and completely covering the at least one overflow opening.

In accordance with a further feature of the invention, the intermediate plate has a long spiral-shaped overflow canal formed therein parallel to the at least one overflow opening and surrounding the mesh plates.

In accordance with an added feature of the invention, the overflow canal has inlet and outlet openings, and including other mesh plates in the form of electrodes covering one of the openings of the overflow canal.

In accordance with an additional feature of the invention, the at least one overflow opening is in the form of a spiral-shaped canal extending through the intermediate plate and having inlet and outlet openings, the mesh plates covering one of the openings of the canal.

In accordance with yet another feature of the invention, the mesh plates are formed of thin screen or wire fabric.

In accordance with yet a further feature of the invention, the mesh plates are spaced apart by a given distance, the fabric has mesh openings with a given width and wires with a given thickness, and the given width and thickness being at most ⅓ of the given spacing between the mesh plates.

In accordance with a concomitant feature of the invention, the given distance between the mesh plates is substantially between 1 and 5 mm.

Other features which are considered as characteristic for the invention are set forth in the appended claims.

Although the invention is illustrated and described herein as embodied in an active two-chamber engine mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 3:
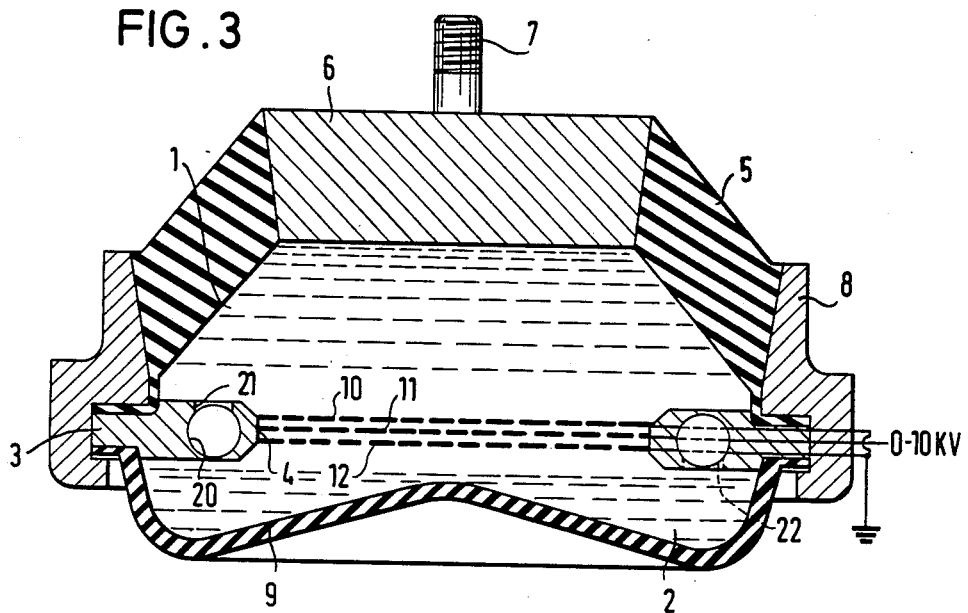
FIG. 3 is a longitudinal-sectional view of the engine mount with a parallel configuration of an overflow opening in the intermediate plate which is covered by mesh plates, and a spiral-shaped canal without mesh plates.
Figure 4:
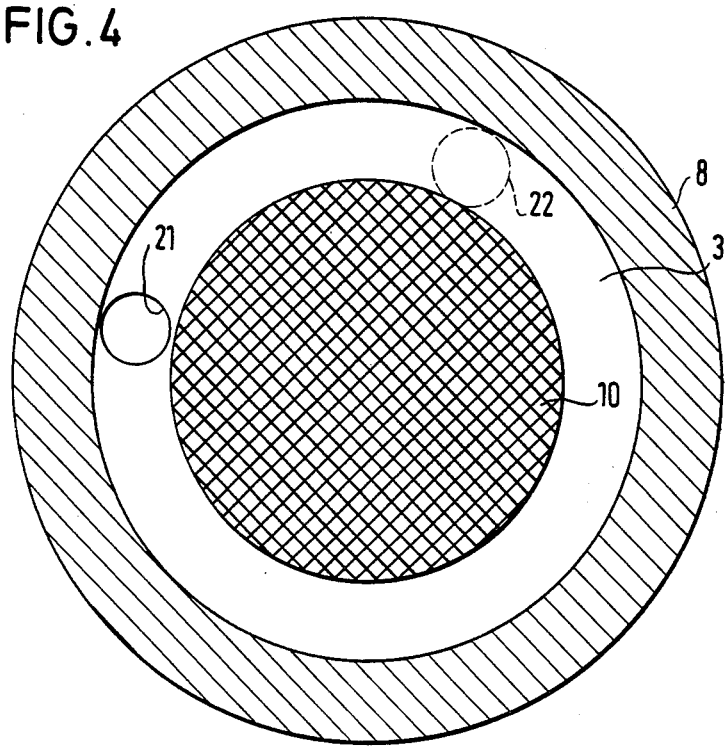
Figure 5:
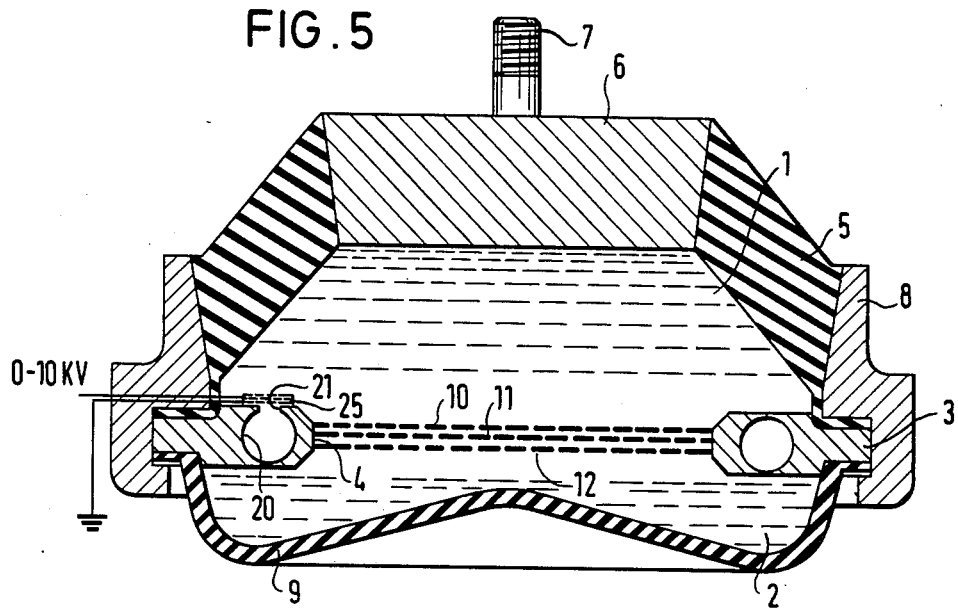
Figure 6:
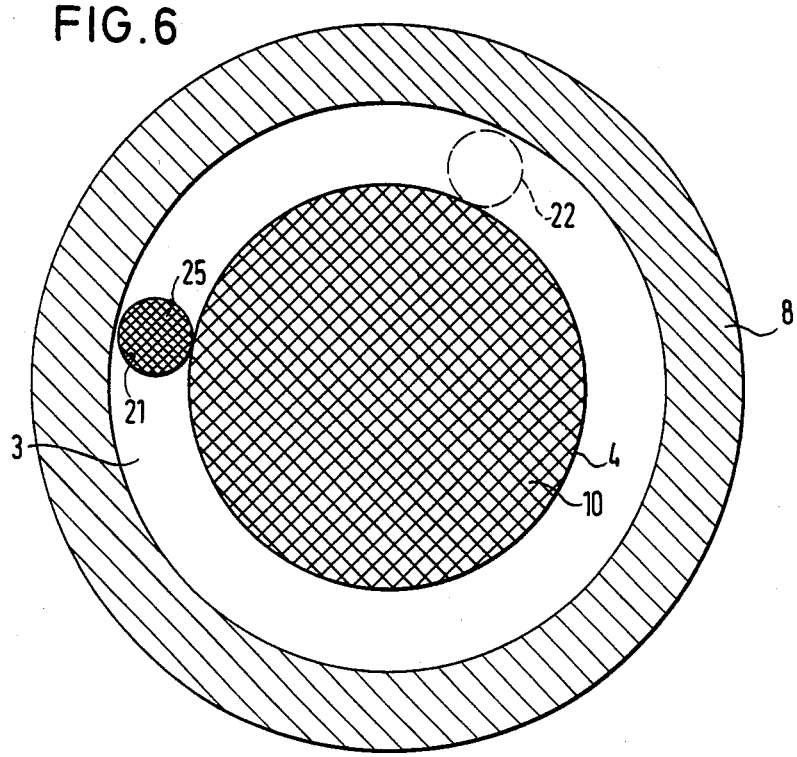
Figure 7:
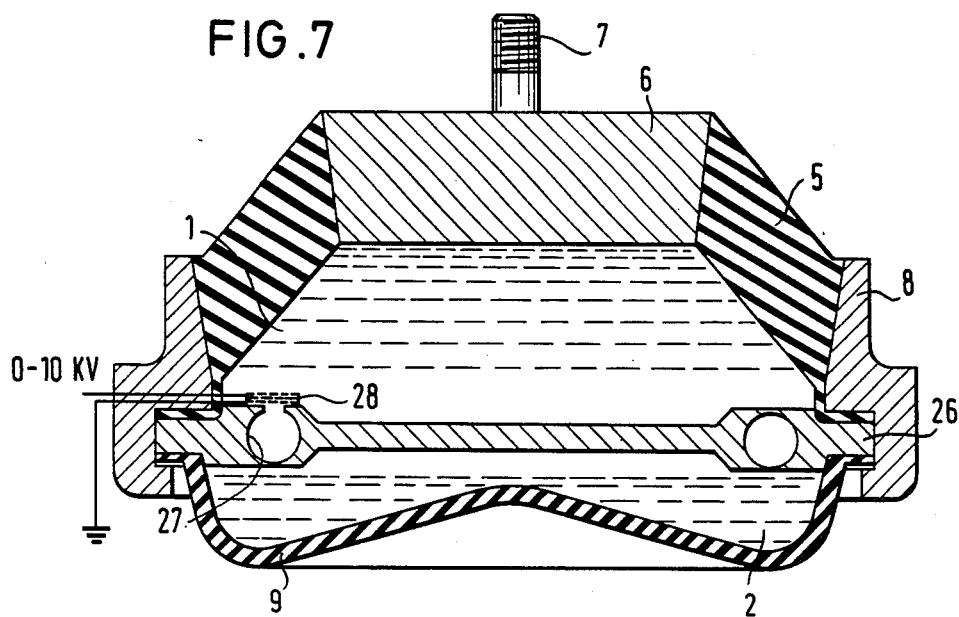
Figure 8:
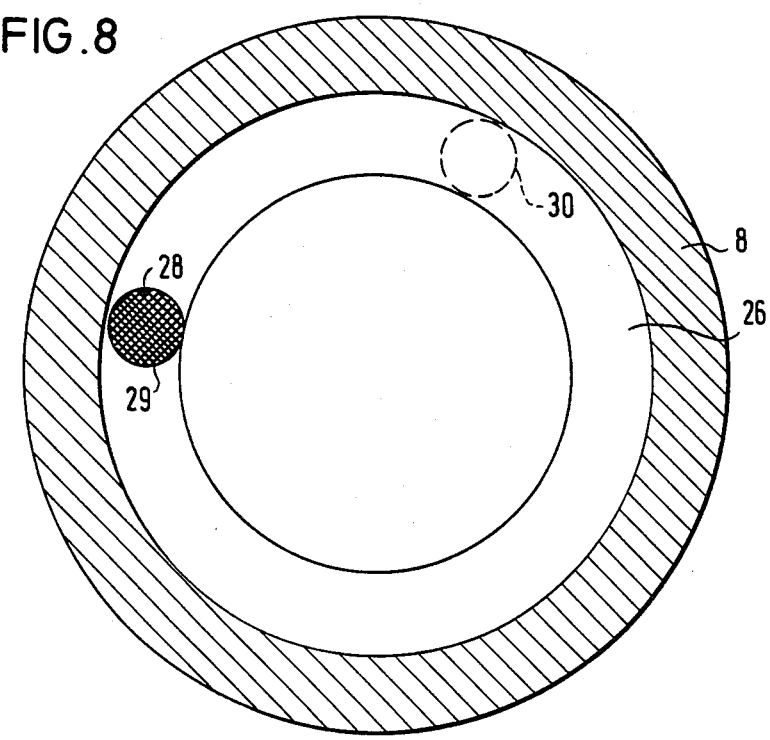

FIG. 4 a cross-sectional view through the engine mount according to FIG. 3 with a view of the intermediate plate;

FIG. 5 is a longitudinal-sectional view of an engine mount with two parallel overflow openings corresponding to FIG. 3 which are both covered with mesh plates;

FIG. 6 is a cross-sectional view through the engine mount according to FIG. 5 with a view of the intermediate plate;

FIG. 7 is a longitudinal-sectional view of an engine mount with a spiral-shaped canal with mesh plates in thee intermediate plate;

FIG. 8 is a cross-sectional view of the engine mount according to FIG. 7 with a view of the intermediate plate.

Figure 1:
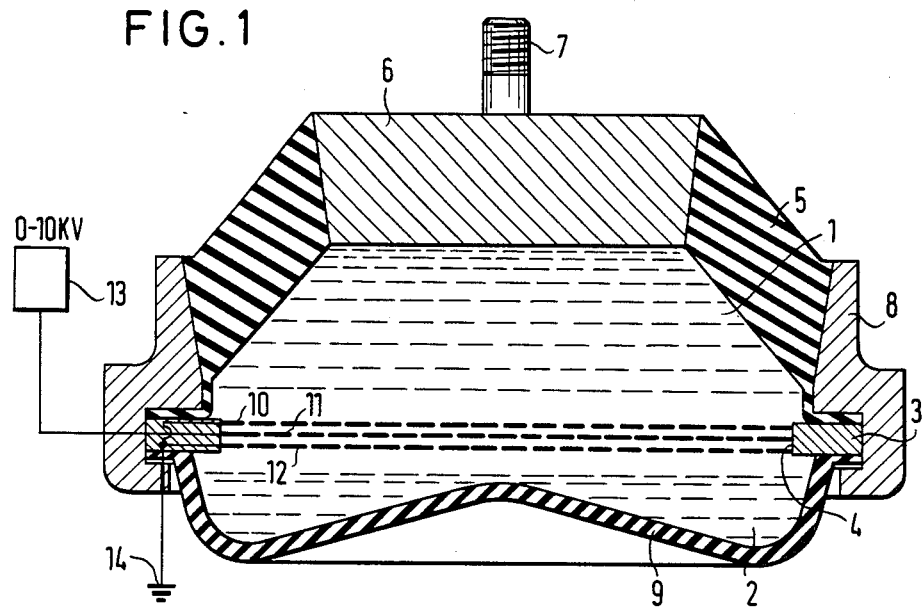
FIG. 1 is a schematic and diagrammatic cross-sectional view of an engine mount with an overflow opening which extends vertically through an intermediate plate.
Figure 2:
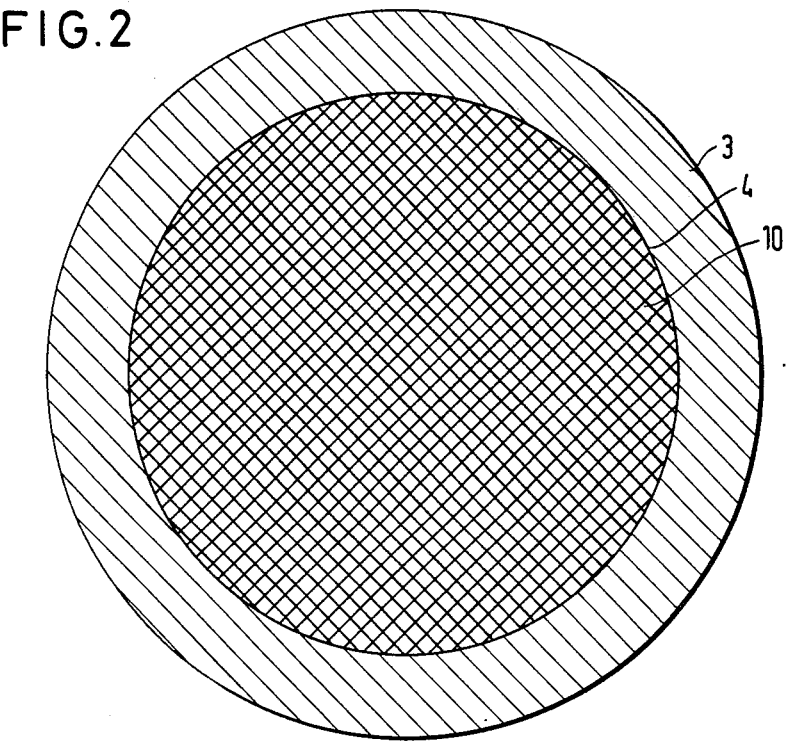
FIG. 2 is a cross-sectional view through the intermediate plate of the engine mount according to FIG. 1 with screen or mesh plates.

Referring now to the figures of the drawings in detail and first, particularly, to FIG. 1 thereof, it is seen that the two-chamber engine mount or motor support is formed in a conventional manner of an upper chamber 1 and a lower chamber 2, which are hydraulically connected with each other by an overflow opening 4 in an intermediate plate 3, that will be described below. The upper chamber 1 is formed by a hollow, conical, solid, thick or strong chamber wall 5 made of a rubber-elastic material. For example, the chamber wall can be fastened at the upper surface thereof to an engine or motor by a support plate 6 and a stud or bolt 7, and it can be connected at the lower region thereof to a non-illustrated counter support with a holding flange 8. The lower chamber 2 is formed, for example, by a suacer or cup-shaped chamber wall which is also made of a rubber-elastic material, but is softer than the material of the upper chamber, and also is connected with the flange 8.

In the illustrated embodiment, the intermediate plate 3 has an overflow opening 4 with a diameter that may be as much as 90% of the diameter of the intermediate plate. Three parallel mesh, screen or sieve plates 10, 11, 12 are inserted into the overflow opening 4 and completely fill the overflow opening 4. The individual mesh plates are formed of a thin screen or wire fabric with a mesh opening width of about 1 mm and the mesh plates are spaced apart by about 3 mm. The width of the openings and the thickness of the wire in the mesh plates are selected in such a way that both values are small as compared to the distance between the mesh plates. Generally, the width of the mesh openings as well as the thickness of the wires should be at most $\frac{1}{3}$ of the distance between the mesh plates 10, 11, 12.

The middle plate 11 of the three illustrated mesh plates is connected as an electrode to a voltage source 13, while the two other mesh plates 10 an 12 are at the potential of a ground 14.

The engine mount itself is filled with an electro-viscous fluid, the ground or base viscosity of which lies between about 100 and 1000 mPa×s. Such electro-viscous fluids are known from U.S. Pat. Nos. 2,886,151 and 3,047,507, and can be formed, for example, of a mixture of about 40 to 60% by weight of silicic acid in solid form, 30 to 50% by weight of a suitable organic phase with a low electricity constant, 5 to 10% by weight of water and 5% by weight of a dispersion agent.

By applying an electric field between the mesh plates 10, 11, 12 the viscosity of the fluid can be increased by a factor of between 3 and 100, so that a fluid transfer through the overflow opening can be practically stopped and the opening is virtually closed. This permits a very effective means for regulating the damping values of a engine mount of this type, while there is only a small change in the dynamic stiffness over a wide frequency range. However, if the electrode field is not turned-on, the resistance to flow of such a support is very low, so that at low frequencies it behaves like support formed of only rubber, because there is hardly any resistance to the flow of liquid from one chamber into the other.

In the illustrated embodiment which is used as an example, three mesh plates 10, 11, and 12 are provided. However it is also possible to choose a number of mesh plates between 2 and 8, so that the mesh plates alternatingly act as electrodes and that the control voltage is applied to every other mesh plate while the other mesh plates are at ground potential. In practice, 3 to 5 mesh plates are preferably used. Due to the dimensioning of the mesh plates and the small width of the mesh openings in relation to the spacing between the mesh plates, a comparatively homogenous electric field is formed, similar to that between capacitor plates without holes.

In the embodiment according to FIGS. 3 and 4, a conventional spiral-shaped canal 20 is formed in the intermediate plate 3, parallel to the overflow opening 4 which contains the mesh plates 10, 11, 12. The canal 20 has an inlet opening 21 leading into the upper chamber 1 and a lower outlet opening 22 leading into the lower chamber 2. The openings are off-set relative to each other by about 240 degrees in the illustrated embodiment. The overflow canal 20 determines the height and frequency range of the maximum damping provided by the liquid column which vibrates therein, similar to conventional, hydraulically damped engine mounts. It is therefore advantageous if the dimensions of the the channel are tuned to the volume-stiffness of the mount and the specific weight and viscosity of the fluid so that the liquid column which vibrates in the canal 20 has a self-resonance (frequency) of between 2 and 50 Hz.

If the passage of fluid through the overflow opening 4 is blocked by applying voltage to the mesh plates 10, 11, 12 and a fluid exchange can only take place through the canal 20, such an engine mount functions like a conventional hydraulically damped mount with inertia effects. In the voltage-free state, the canal 20 is practically bridged or shunted by the overflow opening 4, which has very little flow resistance. At low frequencies, the engine mount functions almost like a rubber mount, because there is practically no resistance to a fluid transfer from one chamber to the other.

In the embodiment according to FIGS. 5 and 6, which correspond to an engine mount with the mechanical construction according to FIGS. 3 and 4, the overflow canal 20 is also provided with a mesh plate package 25, which in the illustrated position is disposed at the inlet opening 21 of the canal 20. It is also feasible to place the mesh plate package 25 at the outlet opening 22 of the canal. The use of the mesh plate package 25 also permits the parallel overflow canal 20 to be closed more or less by applying an electric field, so that the flow through the two parallel canals 4 and 20 can be individually controlled and tuned to each other.

As shown in the embodiment according to FIGS. 7 and 8, in principle it is also possible to individually control hydraulically-damped two-chamber engine mounts which are only are provided with a rigid intermediate plate 26, by using a conventional spiral canal 27 with a mesh plate package 28 at an inlet opening 29 or at an outlet opening 30 of the canal.

Thus, with the use of mesh plates as electrodes and the above-described configurations, active control of hydraulically-damped engine mounts with overflow canals of varied cross-sections and the flow in the canals can also be regulated by a mesh electrode package, which only offers a very low flow resistance if not energized. Therefore, the construction of the canals is no longer dependent on the geometry of the electrodes, which is determined by the maximum electrical field strength or considerations for avoiding peak discharges or dielectric breakdowns.

I claim:

1. Active two-chamber engine mount with hydraulic damping, comprising rubber-elastic peripheral walls, a rigid intermediate plate disposed between said walls defining two chambers, an electro-viscous damping liquid filling said chambers and flowing in a given liquid flow direction through at least one overflow opening formed in said rigid intermediate plate, said chambers being separated by said intermediate plate except for said at least one overflow opening interconnecting said chambers, at least two mutually parallel metallic mesh plates successively disposed across said given liquid flow direction in said at least one overflow opening, and means for applying an electric field between adjacent mesh plates as electrodes in a direction substantially transverse to said liquid flow direction for controlling the viscosity of said liquid.

2. Active two-chamber engine mount according to claim 1, wherein said at least one overflow opening has a diameter of at most 90% of the diameter of said intermediate plate, said mesh plates completely covering said at least one overflow opening.

3. Active two-chamber engine mount according to claim 2, wherein said intermediate plate has an overflow canal formed therein parallel to said at least one overflow opening.

4. Active two-chamber engine mount according to claim 3, wherein said overflow canal has inlet and outlet openings, and including other mesh plates in the form of electrodes covering at least one of said openings of said overflow canal.

5. Active two-chamber engine mount according to claim 4, wherein said mesh plates are formed of thin screen or wire fabric.

6. Active two-chamber motor support according to claim 5, wherein said mesh plates are spaced apart by a given distance, said fabric has mesh openings with a given width and wires with a given thickness, and said given width and thickness being at most ⅓ of said given spacing between said mesh plates.

7. Active two-chamber engine mount according to claim 6, wherein said given distance between said mesh plates is substantially between 1 and 5 mm.

8. Active two-chamber engine mount according to claim 1, wherein said at least one overflow opening is in the form of a canal extending through said intermediate plate and having inlet and outlet openings, said mesh plates covering at least one of said openings of said canal.

9. Active two-chamber engine mount according to claim 8, wherein said mesh plates are formed of thin screen or wire fabric.

10. Active two-chamber motor support according to claim 9, wherein said mesh plates are spaced apart by a given distance, said fabric has mesh openings with a given width and wires with a given thickness, and said given width and thickness being at most ⅓ of said given spacing between said mesh plates.

11. Active two-chamber engine mount accrding to claim 10, wherein said given distance between said mesh plates is substantially between 1 and 5 mm.

12. Active two-chamber engine mount according to claim 1, wherein said mesh plates are formed of thin screen or wire fabric.

13. Active two-chamber motor support according to claim 12, wherein said mesh plates are spaced apart by a given distance, said fabric has mesh openings with a given width and wires with a given thickness, and said given width and thickness being at most ⅓ of said given spacing between said mesh plates.

14. Active two-chamber engine mount according to claim 13, wherein said given distance between said mesh plates is substantially between 1 and 5 mm.

* * * * *